United States Patent
Wright et al.

(10) Patent No.: US 7,626,950 B2
(45) Date of Patent: Dec. 1, 2009

(54) SIP-BASED SESSION CONTROL AMONG A PLURALITY OF MULTIMEDIA DEVICES

(75) Inventors: Steven A. Wright, Roswell, GA (US);
Albert Whited, Atlanta, GA (US);
Thomas A. Anschutz, Conyers, GA (US); Randy Zimler, Gainesville, GA (US)

(73) Assignee: AT&T Intellectual Property, I,L.P., Wilmington, DE (US)

( * ) Notice: Subject to any disclaimer, the term of this patent is extended or adjusted under 35 U.S.C. 154(b) by 648 days.

(21) Appl. No.: 11/026,248

(22) Filed: Dec. 30, 2004

(65) Prior Publication Data

US 2006/0041688 A1    Feb. 23, 2006

Related U.S. Application Data

(60) Provisional application No. 60/602,493, filed on Aug. 18, 2004.

(51) Int. Cl.
*H04L 12/28* (2006.01)
*H04J 3/16* (2006.01)

(52) U.S. Cl. .................. 370/260; 370/395.2; 370/467

(58) Field of Classification Search ............. 370/260, 370/262, 277, 352, 282, 278, 390, 270, 401, 370/395.2, 467, 395.72; 709/207, 227, 229; 455/411, 426.1, 503; 719/318; 725/95; 348/14.08; 704/271; 379/114.13; 705/51; 707/13
See application file for complete search history.

(56) References Cited

U.S. PATENT DOCUMENTS

| | | | |
|---|---|---|---|
| 4,935,951 A | 6/1990 | Robinson et al. | |
| 4,993,058 A | 2/1991 | McMinn et al. | |
| 5,012,507 A | 4/1991 | Leighton et al. | |
| 5,161,180 A | 11/1992 | Chavous | |
| RE34,677 E | 7/1994 | Ray et al. | |
| 5,511,111 A | 4/1996 | Serbetcioglu et al. | |
| 5,526,406 A | 6/1996 | Luneau | |
| 5,572,576 A | 11/1996 | Klausner et al. | |
| 5,621,379 A | 4/1997 | Collins | |
| 5,673,304 A | 9/1997 | Connor et al. | |
| 5,724,412 A | 3/1998 | Srinivasan | |
| 5,796,806 A | 8/1998 | Birckbichler | |
| 5,805,587 A | 9/1998 | Norris et al. | |
| 5,883,942 A | 3/1999 | Lim et al. | |
| 5,940,474 A | 8/1999 | Ruus | |

(Continued)

OTHER PUBLICATIONS

U.S. Appl. No. 11/318,110, filed Dec. 2005.

(Continued)

*Primary Examiner*—Aung S Moe
*Assistant Examiner*—Awet Haile
(74) *Attorney, Agent, or Firm*—Cantor Colburn LLP

(57) ABSTRACT

These exemplary embodiments utilize Sessions Initiation Protocol (SIP) for admission control among a plurality of multimedia devices. The use of the SIP allows a SIP server to perform admission control functions. The use of RSVP linkages is reduced. The use of SIP for admission control allows an application to communicate, or "talk," to a network and other multimedia devices and to request that resources within the network be reserved. Any communications device that uses sessions may utilize the SIP protocol for admission control. The SIP protocol may be used for unicast and multicast media sessions including video-on-demand and/or multicast video access control.

3 Claims, 7 Drawing Sheets

U.S. PATENT DOCUMENTS

| | | | |
|---|---|---|---|
| 5,940,475 | A | 8/1999 | Hansen |
| 5,999,525 | A | 12/1999 | Krishnaswamy |
| 6,009,148 | A | 12/1999 | Reeves |
| 6,011,473 | A | 1/2000 | Klein |
| 6,104,800 | A | 8/2000 | Benson |
| 6,144,644 | A | 11/2000 | Bajzath et al. |
| 6,208,718 | B1 | 3/2001 | Rosenthal |
| 6,208,726 | B1 | 3/2001 | Bansal et al. |
| 6,215,993 | B1 | 4/2001 | Ulveland |
| 6,219,413 | B1 | 4/2001 | Burg |
| 6,259,692 | B1 | 7/2001 | Shtivelman |
| 6,307,920 | B1 | 10/2001 | Thomson et al. |
| 6,310,946 | B1 | 10/2001 | Bauer et al. |
| 6,343,115 | B1 | 1/2002 | Foldare et al. |
| 6,347,136 | B1 | 2/2002 | Horan |
| 6,356,756 | B1 | 3/2002 | Koster |
| 6,434,126 | B1 | 8/2002 | Park |
| 6,476,763 | B2 | 11/2002 | Allen, Jr. |
| 6,512,776 | B1 | 1/2003 | Jones |
| 6,529,500 | B1 | 3/2003 | Pandharipande |
| 6,529,726 | B1 | 3/2003 | Rhodes |
| 6,603,977 | B1 | 8/2003 | Walsh et al. |
| 6,608,886 | B1 | 8/2003 | Contractor |
| 6,622,016 | B1 | 9/2003 | Sladek et al. |
| 6,624,754 | B1 | 9/2003 | Hoffman et al. |
| 6,661,785 | B1 | 12/2003 | Shang et al. |
| 6,665,388 | B2 | 12/2003 | Bedingfield |
| 6,665,611 | B1 | 12/2003 | Oran et al. |
| 6,674,745 | B1 | 1/2004 | Schuster et al. |
| 6,678,357 | B2 | 1/2004 | Stumer et al. |
| 6,680,998 | B1 | 1/2004 | Bell et al. |
| 6,703,930 | B2 | 3/2004 | Skinner |
| 6,704,576 | B1 | 3/2004 | Brachman |
| 6,718,021 | B2 | 4/2004 | Crockett et al. |
| 6,724,872 | B1 | 4/2004 | Moore |
| 6,751,218 | B1* | 6/2004 | Hagirahim et al. .......... 370/390 |
| 6,771,742 | B2 | 8/2004 | McCalmont et al. |
| 6,792,081 | B1 | 9/2004 | Contractor |
| 6,804,338 | B1 | 10/2004 | Chen |
| 6,816,481 | B1 | 11/2004 | Adams |
| 6,842,448 | B1 | 1/2005 | Norris et al. |
| 6,868,074 | B1 | 3/2005 | Hanson |
| 6,912,399 | B2 | 6/2005 | Zirul et al. |
| 6,931,117 | B2 | 8/2005 | Roberts |
| 6,940,950 | B2 | 9/2005 | Dickinson et al. |
| 6,947,531 | B1* | 9/2005 | Lewis et al. ............ 379/114.13 |
| 7,024,461 | B1* | 4/2006 | Janning et al. .............. 709/207 |
| 7,099,944 | B1* | 8/2006 | Anschutz et al. ............ 709/227 |
| 7,277,858 | B1* | 10/2007 | Weaver et al. ............... 704/271 |
| 2002/0072348 | A1 | 6/2002 | Wheeler et al. |
| 2002/0160745 | A1 | 10/2002 | Wang |
| 2002/0176404 | A1* | 11/2002 | Girard ........................ 370/352 |
| 2003/0073453 | A1* | 4/2003 | Basilier ...................... 455/503 |
| 2003/0211839 | A1 | 11/2003 | Baum et al. |
| 2003/0216148 | A1 | 11/2003 | Henderson |
| 2003/0224758 | A1* | 12/2003 | O'Neill et al. .............. 455/411 |
| 2004/0008680 | A1 | 1/2004 | Moss |
| 2004/0028062 | A1* | 2/2004 | Pirhonen et al. ............ 370/401 |
| 2004/0037403 | A1 | 2/2004 | Koch |
| 2004/0048612 | A1* | 3/2004 | Virtanen et al. .......... 455/426.1 |
| 2004/0057425 | A1 | 3/2004 | Brouwer et al. |
| 2004/0101123 | A1 | 5/2004 | Garcia |
| 2004/0128694 | A1 | 7/2004 | Bantz |
| 2004/0140928 | A1 | 7/2004 | Cleghorn |
| 2004/0170159 | A1 | 9/2004 | Kim |
| 2004/0194143 | A1 | 9/2004 | Hirose |
| 2004/0226045 | A1 | 11/2004 | Nadarajah |
| 2004/0233907 | A1 | 11/2004 | Hundscheidt |
| 2004/0239754 | A1* | 12/2004 | Shachar et al. ........... 348/14.08 |
| 2004/0244010 | A1* | 12/2004 | Kleyman et al. ............ 719/318 |
| 2005/0007969 | A1 | 1/2005 | Hundscheidt |
| 2005/0047574 | A1 | 3/2005 | Reid |
| 2005/0050211 | A1* | 3/2005 | Kaul et al. .................. 709/229 |
| 2005/0063519 | A1 | 3/2005 | James |
| 2005/0083912 | A1* | 4/2005 | Afshar et al. ............... 370/352 |
| 2005/0144645 | A1* | 6/2005 | Casey et al. .................... 725/95 |
| 2005/0149443 | A1* | 7/2005 | Torvinen ..................... 705/51 |
| 2005/0151642 | A1 | 7/2005 | Tupler et al. |
| 2005/0175166 | A1 | 8/2005 | Welenson et al. |
| 2005/0190750 | A1 | 9/2005 | Kafka |
| 2005/0190892 | A1 | 9/2005 | Dawson et al. |
| 2005/0232243 | A1 | 10/2005 | Adamczyk et al. |
| 2005/0250468 | A1 | 11/2005 | Lu |
| 2005/0281208 | A1* | 12/2005 | Dorenbosch et al. ........ 370/270 |
| 2008/0288458 | A1* | 11/2008 | Sun et al. ....................... 707/3 |

OTHER PUBLICATIONS

US 5,905,788, 05/1999, Bauer et al. (withdrawn)

* cited by examiner

SIP-BASED SESSION CONTROL AMONG A PLURALITY OF MULTIMEDIA DEVICES

PRIORITY TO PROVISIONAL APPLICATION

This application claims the benefit of applicants' U.S. Provisional Application No. 60/602,493 filed on Aug. 18, 2004 of which is incorporated herein by reference.

CROSS REFERENCE TO RELATED APPLICATION

This application relates to applicants' co-pending application entitled "SIP-Based Session Control," U.S. patent application Ser. No. 11/026,228 filed simultaneously herewith, incorporated herein by this reference.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

The exemplary embodiments generally relate to computers and to communications and, more particularly, to admission requests and session control in computer networking.

Network admission control is important when delivering service applications to customers. Should a customer request Internet access, video-on-demand, video teleconferencing, IP telephony, interactive gaming, or many other service applications, the service provider must know that adequate bandwidth exists within the network infrastructure. When the customer pays for such service applications, the customer reasonably expects that the available network bandwidth will support such an application. For example, when a customer clicks a pay-per-view button and pays for a movie, that customer expects a "crystal clear" experience. If, however, network bandwidth is only marginally available and the quality of the experience is poor, the customer is understandably dissatisfied. Before a customer is offered a service application, the service provider should know whether that service application can be delivered and supported at a level of quality the customer expects.

Network admission control protocols help determine whether network infrastructure can support a service application. Network admission controls represent an interchange of information between the network elements that support these applications and the elements that initiate the applications. A customer can be offered multiple applications, such as multicast videos (that resemble broadcast TV), unicast video (that resemble pay-per-view services), games, and even voice services. What ever service the customer is offered, the network must be able to support the service. For the service application, there needs to be assurances that the long-lived session as a whole will have the results as necessary to normally operate. For example, in order to coordinate and make sure the next TV that gets turned on, or the next pay preview or the next phone call works, the signaling within the network must determine that the service can be supported. If the signaling determines that the service can be supported, the service is implemented. If, however, the signaling says "no"—the service cannot be supported—the customer's request is deferred. That is, the customer receives some kind of "busy" signal, pop-up message, or other indication that the customer's request will be queued and fulfilled as soon as bandwidth becomes available to support the quality needed for the requested application and/or service.

Network admission control protocols, then, help determine whether network infrastructure can support a service application. Problems with admission control are usually solved by protocols designed specifically for Quality of Service concerns. Admission control in IP networks usually utilizes RSVP protocols. RSVP protocols are typically used between computers and routers to reach reservations of capacity in IP packet networks. A Sessions Initiation Protocol (SIP) server launches an RSVP protocol, and the RSVP protocol creates the resources in the network or the resource reservation network. The problem, however, is that the RSVP linkage is a cumbersome mapping within the SIP server. Another problem is that the RSVP linkage is inefficient when trying to construct admission control across multiple services with different bandwidth requirements and with different service characteristics (such as in the case of unicast and multicast services). What is needed, then, is an admission control protocol that can successfully support multiple service applications, such as multicast service applications and unicast service applications.

SUMMARY

According to exemplary embodiments, the needs described above and other are met by utilizing Sessions Initiation Protocol (SIP) for admission control among a plurality of multimedia devices. Some of the exemplary embodiments described herein allow the SIP server itself to perform the admission control function. Other exemplary embodiments allow SIP-based admission control via a residential gateway, DSLAM, multimedia content source, and/or a multimedia device. The use of RSVP linkages is reduced. The use of SIP for admission control allows an application and/or device to communicate, or "talk," to a network, request that resources within the network be reserved, and receive the requested resource to communicate with a private communications address. Any communications device that uses sessions may utilize the SIP protocol for admission control.

According to an exemplary embodiment, a method for providing a media source using SIP for admission control includes receiving a session initiation protocol invitation from a multimedia device to request a media stream, communicating the session initiation protocol invitation to a multimedia content server via a communications network, receiving a session initiation protocol update from the multimedia content server via the communications network to access the media stream from a second multimedia device, communicating the session initiation protocol invitation from the multimedia device to the second multimedia device, receiving a session initiation protocol confirmation from the second multimedia device to communicate the media stream, and communicating the media stream from the second multimedia device to the private communications address of the multimedia device. The invitation includes the private communications address for communicating with the multimedia device, and the confirmation includes a communications identifier for identifying the media stream. In further embodiments, the method includes presentation of the media stream to the multimedia device. And, during communication of the media stream from the second multimedia device to the multimedia device, a user may activate a media control function to control presentation and communication of the media stream. For example, the presentation function may include a fast-forward function, a rewind function, a pause function, a stop function, a bookmark function, a scene jump function, a status function, and/or an alternate presentation function.

According to another exemplary embodiment, a method for providing a media stream to a multimedia system includes ordering a media stream via a session initiation protocol invitation over a communications network to a content media source, forwarding an updated session initiation protocol invitation to a second private communications address of a second multimedia device, and communicating the media stream from the second multimedia device to a private communications address of a multimedia device. Still another exemplary embodiment is directed to a method for providing a media stream to a multimedia system that includes initiating an order for a media stream via a session initiation protocol invitation over a communications network, translating the session initiation protocol invitation to an internet group management protocol join, communicating the internet group management protocol join to a multicast multimedia content server, receiving an internet group management protocol update, using the update to communicate an updated session initiation protocol invitation to a second multimedia device, and communicating and identifying the media stream from the second multimedia device to a private communications address of a multimedia device. The multicast multimedia content server identifies the second multimedia device as the content source and communicates with the multimedia device (or, alternatively the residential gateway) so that the multimedia device can establish a communications session with the second multimedia device. The second multimedia device accesses, stores, and manages the media stream.

Another exemplary embodiment describes a multimedia gateway device that includes a processing device that uses a session initiation protocol communication with a multimedia device to order a media stream from a multimedia content server over a communications network. The processing device includes instructions for receiving the session initiation protocol invitation from the multimedia device to request a media stream, for communicating the session initiation protocol invitation to the multimedia content server via the communications network, for forwarding an updated session initiation protocol invitation to a second private communications address of a second multimedia device, and for communicating and identifying the media stream from the second multimedia device to a private communications address of a multimedia device. According to some embodiments, the multimedia device may be embodied in a set top box, a computer, a residential gateway, and/or any device having a digital signal processor (i.e., the processing device).

Still another exemplary embodiment describes a system that includes a media stream source in communication with a multimedia content server, the multimedia content server for processing a session initiation protocol invitation from a multimedia device to access and/or order the media stream from the media stream source, and a processing device that uses session initiation protocol communications to access, order, communicate and/or otherwise manage the media stream from the multimedia content server of a communications network. In a further embodiment, the multimedia content server is a second multimedia device and the multimedia content server of the communications network facilitates establishing a communications session among the multimedia device and the second multimedia device.

Yet other exemplary embodiments describe computer program products to perform the methods described above. For example, an embodiment describes a storage medium on which is encoded instructions for initiating an order for a media stream via a session initiation protocol invitation over a communications network, for translating the session initiation protocol invitation to an internet group management protocol join, for communicating the internet group management protocol join to a multicast multimedia content server, for receiving an internet group management protocol update, for using the update to communicate an updated session initiation protocol invitation to a second multimedia device, and for communicating and identifying the media stream from the second multimedia device to a private communications address of a multimedia device. And, another exemplary embodiment describes a storage medium on which is encoded instructions for ordering a media stream via a session initiation protocol invitation over a communications network to a content media source, forwarding an updated session initiation protocol invitation to a second private communications address of a second multimedia device, and communicating the media stream from the second multimedia device to a private communications address of a multimedia device.

Other systems, methods, and/or computer program products according to embodiments will be or become apparent to one with skill in the art upon review of the following drawings and detailed description. It is intended that all such additional systems, methods, and/or computer program products be included within and protected by this description and be within the scope of this invention.

DESCRIPTION OF THE DRAWINGS

The above and other embodiments, objects, uses, advantages, and novel features are more clearly understood by reference to the following description taken in connection with the accompanying figures, wherein.

DETAILED DESCRIPTION OF EXEMPLARY EMBODIMENTS

Figure 1:
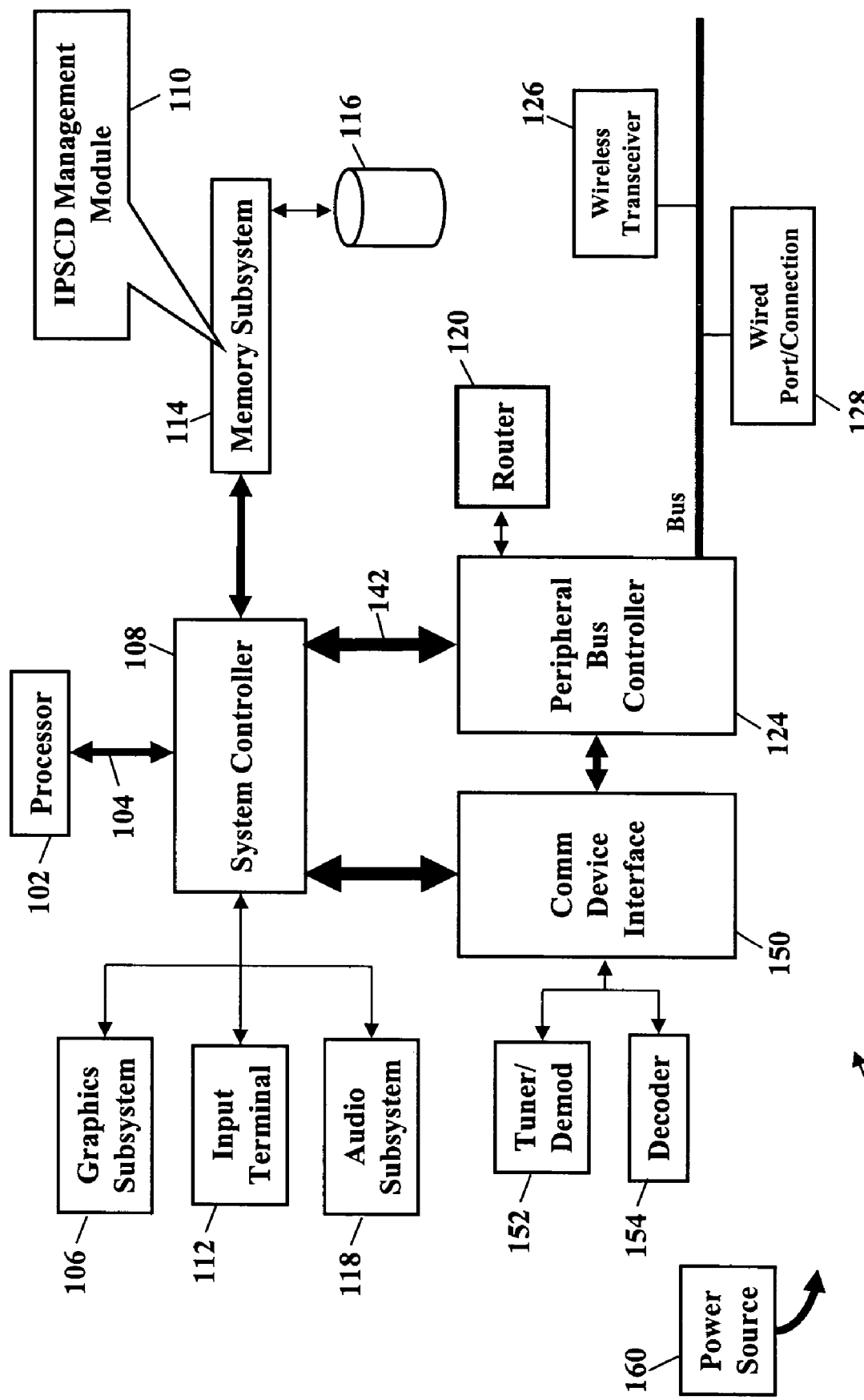
FIG. 1 illustrates a block diagram of exemplary details of a multimedia device according to some of the embodiments of this invention.

The exemplary embodiments now will be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, flowcharts, illustrations, and the like represent conceptual views or processes illustrating systems, methods and computer program products embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

According to exemplary embodiment, a Sessions Initiation Protocol (SIP) is used for establishing admission control between a plurality of multimedia devices, e.g., a first multimedia device and a second multimedia device identified as a content source. Some of the exemplary embodiments described herein allow the SIP server itself to perform the admission control function. Other exemplary embodiments allow SIP-based admission control via a multimedia device, or alternatively, via a residential gateway, DSLAM, or multimedia content source. The use of RSVP linkages is reduced. The use of SIP for admission control allows an application and/or device to communicate, or "talk," to both a network and to private devices (e.g., the second multimedia device), request that resources within the network and/or the second multimedia device be reserved, and receive the requested resource (e.g., the media stream) to communicate with a private communications address (e.g., the multimedia device). Any communications device that uses sessions may utilize the SIP protocol for admission control.

The SIP protocol may be used for video-on-demand and/or multicast video access control. One of the advantages, in fact, is that the requesting communications device does not need to know whether the media stream is delivered over a unicast or a multicast media session. User signaling at the application layer for the video service, or for these multimedia services, is performed using SIP. The application layer is using SIP, the network is aware of this, and the network accordingly adjusts. Where communications and/or computing devices proxy messages forward, the equipment in the network is aware of the SIP transactions. The network equipment then makes the necessary changes in the network in response to the SIP transactions. The SIP is used as a networking layer protocol between end points to a session (e.g., a customer's computer or set-top box and a content server). The SIPs can accept a wide range of media types including unicast or multicast IP addresses and Uniform Resource Locators (URLs) to define the location of the media stream. The requesting end point to the media session can be used for media display services such as TVoIP as well as participating in bi-directional media services (e.g., multimedia conferencing).

The exemplary embodiments also utilize URLs. The use of URLs permits the use of a Domain Name Server (DNS) system to provide translation between the URL name and the network address of the media source. This permits a common name space to include multicast and unicast unidirectional media as well as bi-directional services such as multimedia conferencing. The DNS system may be localized to a network of a service provider (e.g., Bellsouth), or published to the public internet.

Because of this architectural approach, the SIP environment now encompasses both multicast and unicast sessions and unidirectional and bidirectional media flows. The SIP protocol identifies all of the IP traffic flows that are substantial enough to be considered as "sessions." Having this unified list of sessions is important for admission control purposes associated with the SIP servers. Because SIP servers know the number of sessions and the types of sessions, SIP servers may implement the resource constraint admission control decision(s), when they also know the resource(s) available and the resource requirements of the various media types. The latter are relatively static data that can be provisioned. For example, if the SIP server providing admission control provides admission control for multiple links and multiple network elements, it may be considered as acting as a type of bandwidth broker. An SIP server implementing admission control scoped within a single network element may also be bundled with that network element. Such an implementation where the SIP server and admission control function are scoped to a Digital Subscriber Line Access Multiplexer (DSLAM) may have implementation advantages in easily facilitating the sessions.

Referring now to the figures, FIG. 1 is a block diagram showing an Internet Protocol Service Consumer Device (IPSCD) Management Module 110 residing in a computer system shown as a multimedia device 100 (also referred to herein as an Internet Protocol Service Consumer Device (IPSCD)). As FIG. 1 shows, the IPSCD Management Module 110 operates within a system memory device. The IPSCD Management Module 110, for example, is shown residing in a memory subsystem 114. The IPSCD Management Module 110, however, could also reside in flash memory or a peripheral storage device 116. The multimedia device 100 also has one or more central processors 102 executing an operating system. As one skilled in the art would appreciate, the operating system has a set of instructions that control the internal functions of the multimedia device 100, and furthermore has the capability to communicate a communications signal among the multimedia device 100, a communications network (e.g., reference numeral 210 in FIG. 2), and/or a connected electronic device capable of communicating audio, graphical, and/or other sensory data (e.g., a TV integrated with the multimedia device 100, a wireless transceiver in an electronic device such as a remote control device, an appliance, a communications device, and/or other devices).

The system controller 108 provides a bridging function between the one or more central processors 102, a video/graphics subsystem 106, an input terminal 112, and an audio subsystem 118, the memory subsystem 114, a PCI (Peripheral Controller Interface) bus, and a Communications ("Comm") Device Interface 150. The PCI bus is controlled by a Peripheral Bus Controller 124. The Peripheral Bus Controller 124 (typically called a "Southbridge") is an integrated circuit that serves as an input/output hub for various peripheral ports and/or transceivers. The Peripheral Bus Controller 124 allows for communications with the communications network and any connected electronic device. The peripheral ports allow the multimedia device 100 to communicate with a variety of devices through networking ports (such as SCSI or Ethernet, not shown) and/or transceivers that include Wireless Communications ("Comm") Device Transceiver 126 (for communication of any frequency signal in the electromagnetic spectrum, such as, for example, Wireless 802.11 and Infrared) and Wired Communications ("Comm") Device Port/Connection 124 (such as modem V90+ and compact flash slots). These peripheral ports could also include other networking ports, such as, a serial port (not shown) and/or a parallel port (not shown). Further, a tuner/demodulator 152 may receive encoded digital signals (e.g., signals from a satellite receiver, a cable feed, and so on) of the media stream. The digital signals are divided into audio and video signals. The tuner/demodulator 152 tunes to the frequency of the media stream. The tuner/demodulator 152 feeds the digital signals into a decoder 154 (either directly or via the Communications Device Interface 150). The tuner/demodulator tunes to the frequency of a selected decoder transport stream that is then decoded and fed to the graphics and audio subsystems 106, 118, such as A/V out jacks to a TV. Further, the multimedia device 100 may include a power source 160, such as a power cord that plugs into an electrical socket, a rechargeable battery to provide power and allow the media deliver device 100 to be portable, and/or others. Additionally, those of ordinary skill in the art understand that the program, processes, methods, and systems described in this patent are not limited to any particular computer system or computer hardware.

As those of ordinary skill in the art would appreciate, the central processor 102 may be implemented with a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described in this patent are not limited to any particular central processor of a manufacturer.

The operating system may be a UNIX® operating system (UNIX® is a registered trademark of the Open Source Group, www.opensource.org). Other UNIX-based operating systems, however, are also suitable, such as LINUX® or a RED HAT® LINUX-based system (LINUX® is a registered trademark of Linus Torvalds, and RED HAT® is a registered trademark of Red Hat, Inc., Research Triangle Park, N.C., 1-888-733-4281, www.redhat.com). Other operating systems, however, are also suitable. Such other operating systems may include a WINDOWS-based operating system (WINDOWS® is a registered trademark of Microsoft Corporation, One Microsoft Way, Redmond Wash. 98052-6399, 425.882.8080, www.Microsoft.com) and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described in this patent are not limited to any particular operating system.

Figure 2:
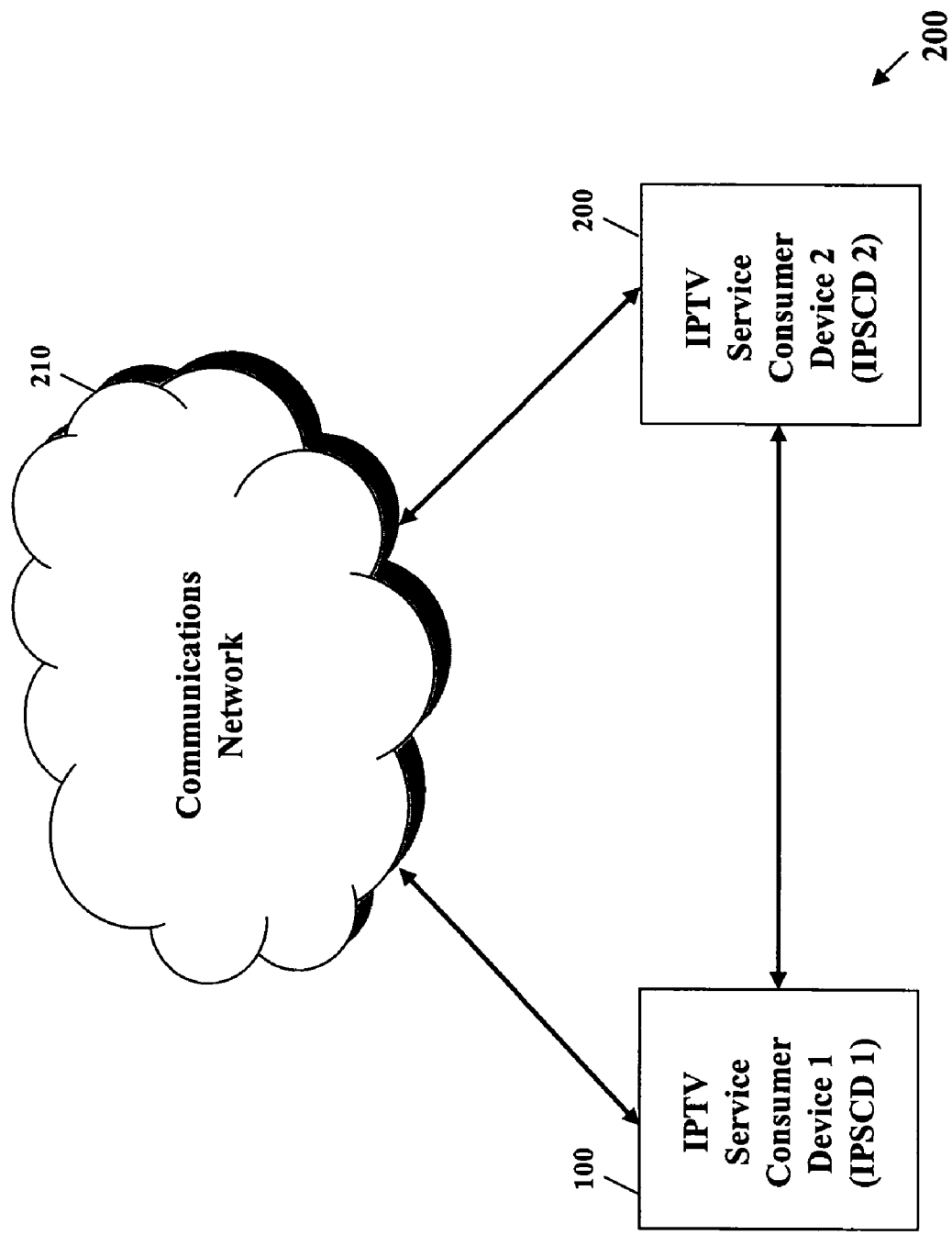
FIG. 2 illustrates an exemplary operating environment for an interactive multimedia system according to some of the embodiments of this invention.

As shown in an embodiment of FIG. 2, the multimedia device 100 communicates with a second multimedia device 220 (also referred to herein as the "content source," "program source," and "multimedia content source") using session initiation protocol (SIP) communications or other alternate protocol-based communications over a communications network 210 to order and/or receive a media stream. The media stream may be any RF and/or digital content, such as data files, television/cable programming, .mpg streams, or any other multimedia content. According to an alternate exemplary embodiment, when the media stream is communicated to the multimedia device 100, the media stream may be stored to the memory subsystem 114 and/or to a peripheral storage device 116. According to another exemplary embodiment, the user may communicate the locally stored media steam to another multimedia device or another communications device via the communications network 210. Further, the communications network 210 may be a distributed computing network, such as, for example, a cable network operating in the radio-frequency domain and/or the Internet Protocol (IP) domain. The communications network 210, however, may also include the Internet (sometimes alternatively known as the "World Wide Web"), an intranet, a local-area network (LAN), and/or a wide-area network (WAN). The communications network 210 may include coaxial cables, copper wires, fiber optic lines, and/or hybrid-coaxial lines. The communications network 210 may even include wireless portions utilizing any portion of the electromagnetic spectrum and any signaling standard (such as the I.E.E.E. 802 family of standards).

Figure 3:
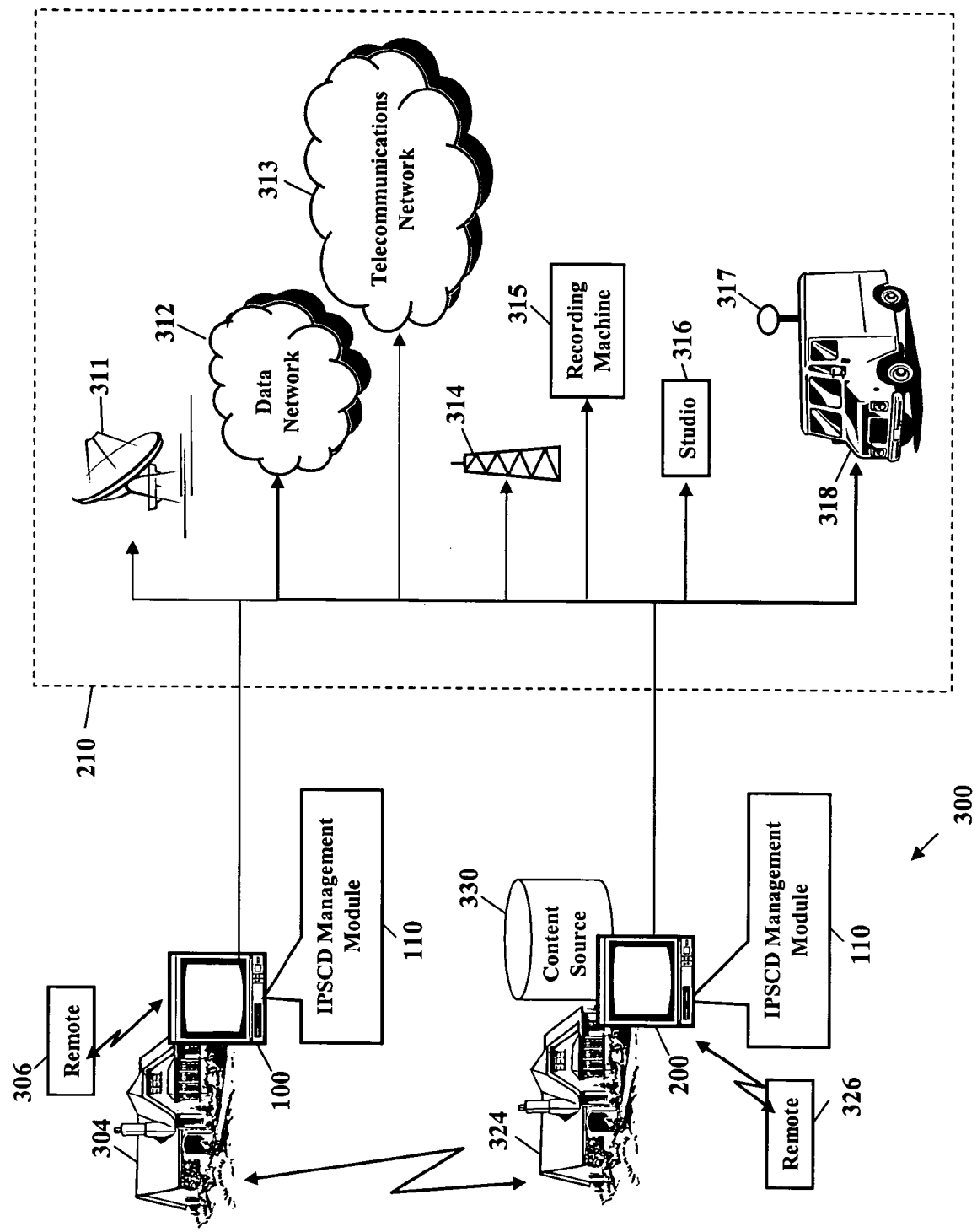
FIG. 3 illustrates another exemplary operating environment for an interactive multimedia system according to some of the embodiments of this invention.

FIG. 3 depicts an exemplary embodiment of SIP-based media delivery operating environment 300 that illustrates a first residence 304 with a multimedia device shown as an integrated residential gateway, set top box, and/or television 100 having the IPSCD management module 110, a remote control device 306, a second residence 324 with a second multimedia device shown as an integrated residential gateway, set top box, and/or television 200 having the IPSCD management module 110, a remote control device 326, and a content source database 330, and one or more communications networks 210. The multimedia device 100 communicates SIP-based requests for graphics, audio and other forms of the media stream from one or more communications networks 210 that include a variety of broadcasts and communication mediums. As shown in FIG. 3, these broadcast and communications systems may include a direct digital broadcast via satellite TV 311, a communication link with a data communications network 312, a communications link with a telecommunication network 313, a broadcast via digital cable TV 314, and/or a terrestrial broadcast analog and/or digital TV such as a broadcast from a recording device 315, a studio 316, or a mobile vehicle 318 with an antenna and receiver 317. Further, the IPSCD management module 110 may interact with a directory-on-demand service (or an alternate source that provides the media stream) via a web browser or alternate interface to present a menu to a display device of the multimedia device 100.

According to an exemplary embodiment, the user initiates a request to order the media stream by interfacing with the IPSCD management module 110 and actuating a pushbutton of the remote control device 306, by voice commands, and/or by other selection methods. According to some of the embodiments, the IPSCD management module 110 presents a graphical user interface that enables a broad range of functionality for accessing, billing, controlling presentation, controlling communications, and/or otherwise managing the media stream. For example, an infrared remote control, an input terminal, and/or an optional wireless keyboard can communicate with the multimedia device 100 to interact with the graphical user interface that is presented on an audio/visual device such as a TV screen. According to one of the exemplary embodiment, furniture (e.g., a couch, a chair, a table, and other furniture) having an integrated input terminal, control panel, and/or communications interface with the multimedia device 100 is used to select the media stream to order, view, and/or otherwise manage and to further act as an input/output with the IPSCD management module 110. The graphical user interface may be used to access one ore more media streams, associated broadcast and on-demand video and audio content, and associated multimedia applications and services.

Figure 4:
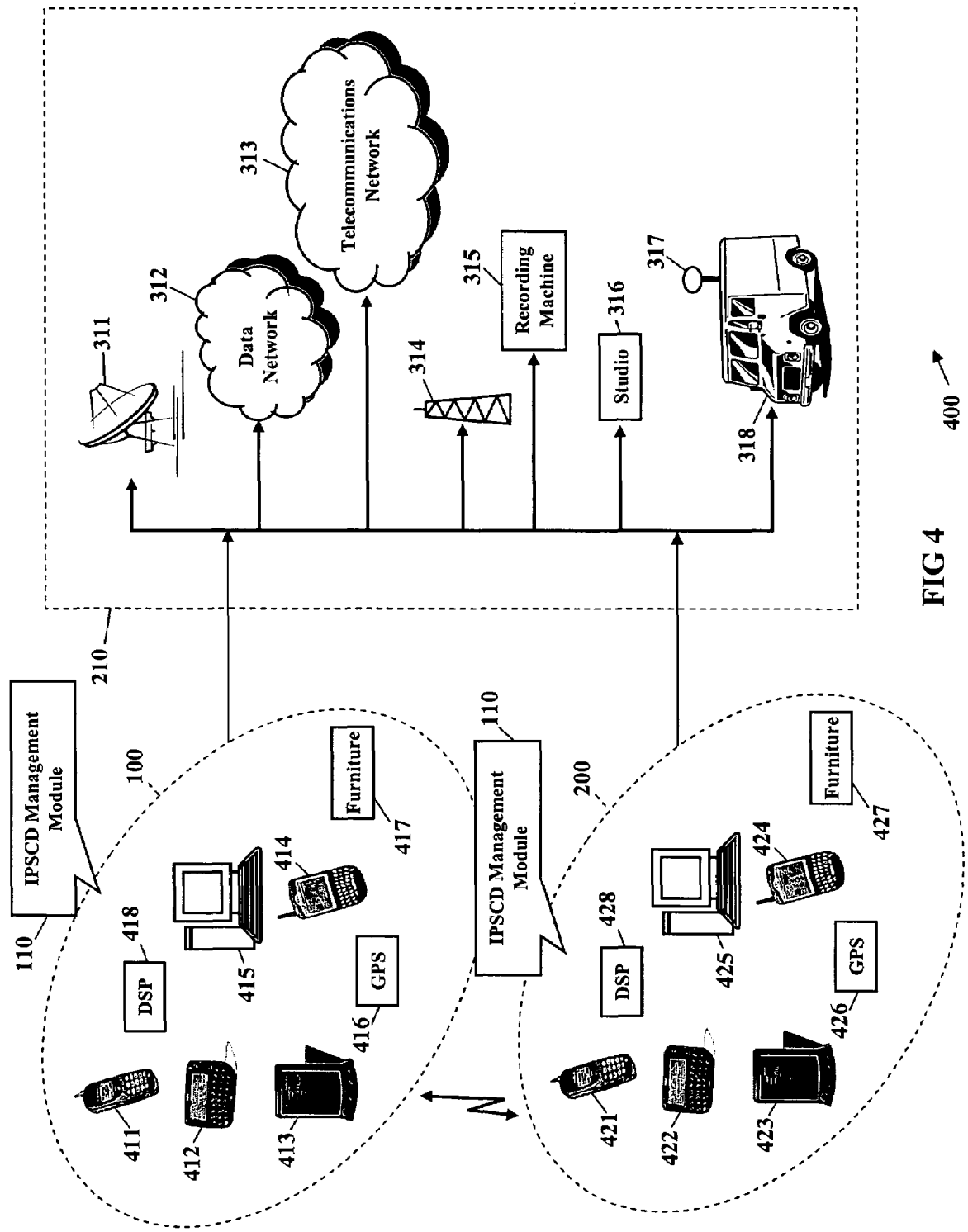
FIG. 4 illustrates yet another exemplary operating environment for an interactive multimedia system according to some of the embodiments of this invention.

FIG. 4 illustrates another exemplary embodiment of SIP-based media delivery operating environment 400 having alternate multimedia devices 100 and 200 that utilize session initiation protocol (SIP) and other protocol-based communications over a communications network 210 to order, access, communicate and/or otherwise manage a media stream. Alternate multimedia devices 100 include a cellular phone 411, an interactive pager 412, a personal digital assistant (PDA) 413, a Voice over Internet Telephony (VoIP) phone 414, a computer system 415, a global positioning system (GPS) 416, a control panel integrated into a piece of furniture such as a couch, chair, or table 417, and any device having a digital signal processor (DSP) 418. Similarly, alternate multimedia devices 200 include a cellular phone 421, an interactive pager 422, a personal digital assistant (PDA) 423, a Voice over Internet Telephony (VoIP) phone 424, a computer system 425, a global positioning system (GPS) 426, a control panel integrated into a piece of furniture such as a couch, chair, or table 427, and any device having a digital signal processor (DSP) 428. Alternate multimedia devices 100, 200 may further include a watch, a radio, vehicle electronics, a clock, a printer, a gateway, and/or another apparatus and system having an AV output. Because these alternate multimedia devices may have limited capabilities, the IPSCD management module 110 may access a remote database to order, access, and/or otherwise manage the media stream and/or associated information and communications with the multimedia content source provider and/or with the second multimedia device 200.

Figure 5:
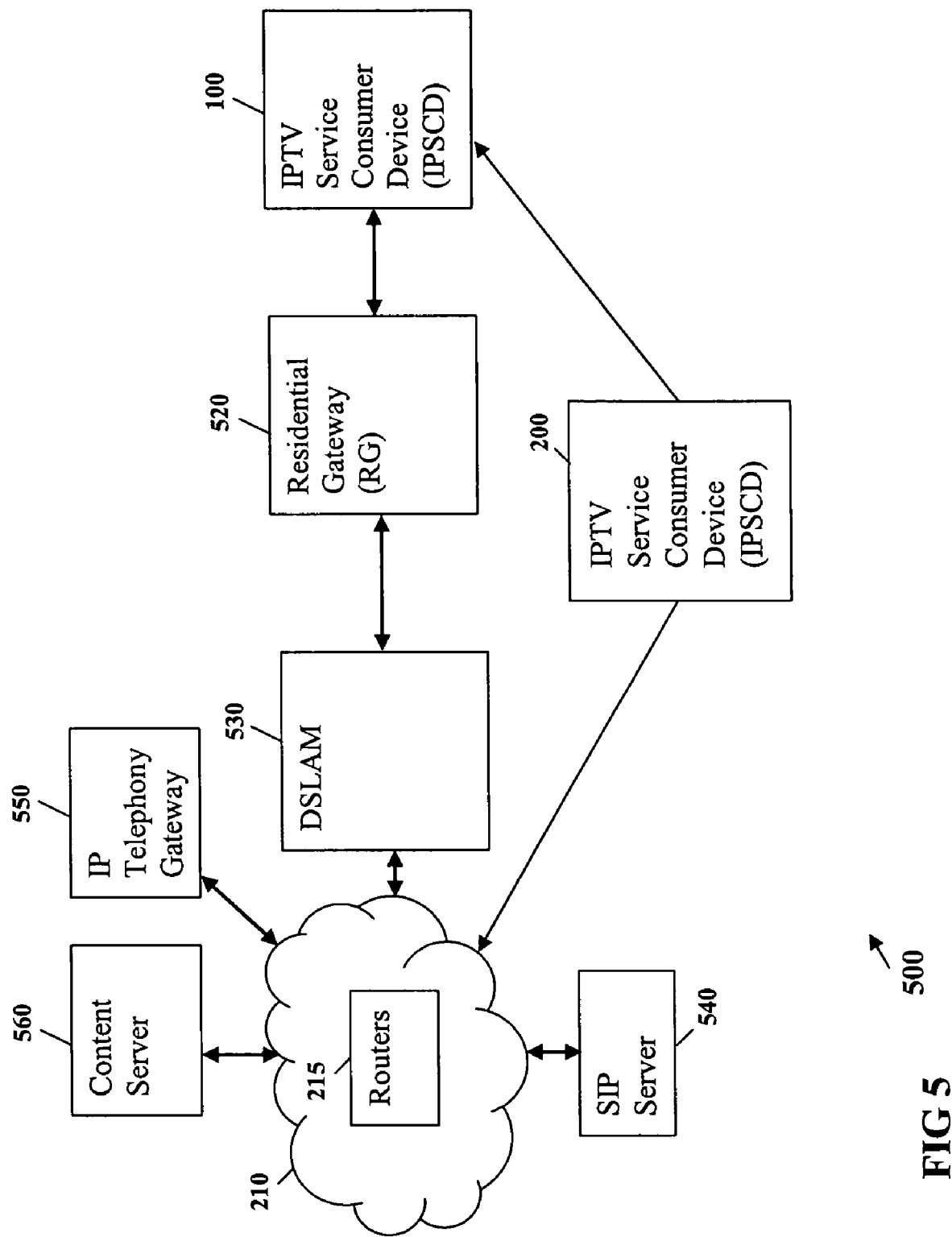
FIG. 5 illustrates still another exemplary operating environment for an interactive multimedia system according to some of the embodiments of this invention.

FIG. 5 illustrates another operating environment 500 for some of the exemplary embodiments. Here, the multimedia device 100 and the second multimedia device 200 typically resides in private IP address spaces, such as, for example, a private communications address of a customer's residence or a business network. The multimedia devices 100, 200 may be any communications device capable of sending and receiving SIP signaling protocols. A residential gateway (RG) 520 communicates with the multimedia device 100 and provides access to the private IP address space and, thus, to the multimedia device 100. The residential gateway 520 communicates with the communications network 210 via a DSLAM 130. Various routers 215 communicating within the communications network 210 route requests, queries, proxies, signaling, messages, and/or data between an SIP server 540, an IP telephony gateway 550, a content server 560, and the second multimedia device 200 having the content source. As shown, the residential gateway 520 may be a stand alone device; however, alternate exemplary embodiments describe the residential gateway 520 integrated with the multimedia device 100.

A viewer (also referred to herein as a "customer," a "subscriber," and/or a "user")) may initiate a multimedia session at the multimedia device 100 (e.g., by selecting an item from a menu, by clicking on a remote control, by voice commands, and/or by other selection methods as described above). The multimedia device 100 initiates the multimedia session with a SIP request communicated towards the communications network 210. Because a residential or a business network (having the multimedia device 100) is a private address space, the residential gateway 520 usually performs a NAT (Network Address Translation) and/or a PAT (Port Address Translation) function. A SIP Application Layer Gateway is expected to exist within the residential gateway 520 to enable the port dynamic multimedia flows to transit from and/or to the residential gateway 520. The SIP server 540 interprets the SIP invite request and initiates the multimedia session with the appropriate elements. This may involve a variety of actions such as SIP redirection to the IP telephony specific SIP based system, proxy functions to remote the authentication and authorization aspects, establishing unidirectional media flows from the content server 560, and/or establishing or joining multicast flows in the communications network 210. The use of a common session initiation protocol also provides a common mechanism to identify all of the sessions that require admission control decisions based on resource constraints, regardless of the type of service involved.

According to an exemplary embodiment, the SIP functionality may be distributed in a variety of ways. In particular, the SIP server 540 may be implemented as a hierarchy of SIP servers (not shown) such that if the first SIP server can not make the decision, the first SIP server acts as a proxy and defers the decision to a higher level SIP server. As an example, one instance of a hierarchy of SIP servers 540 may be implemented at the residential gateway 520 and a higher level SIP server 540 could reside in the communications network 210.

Figure 6:
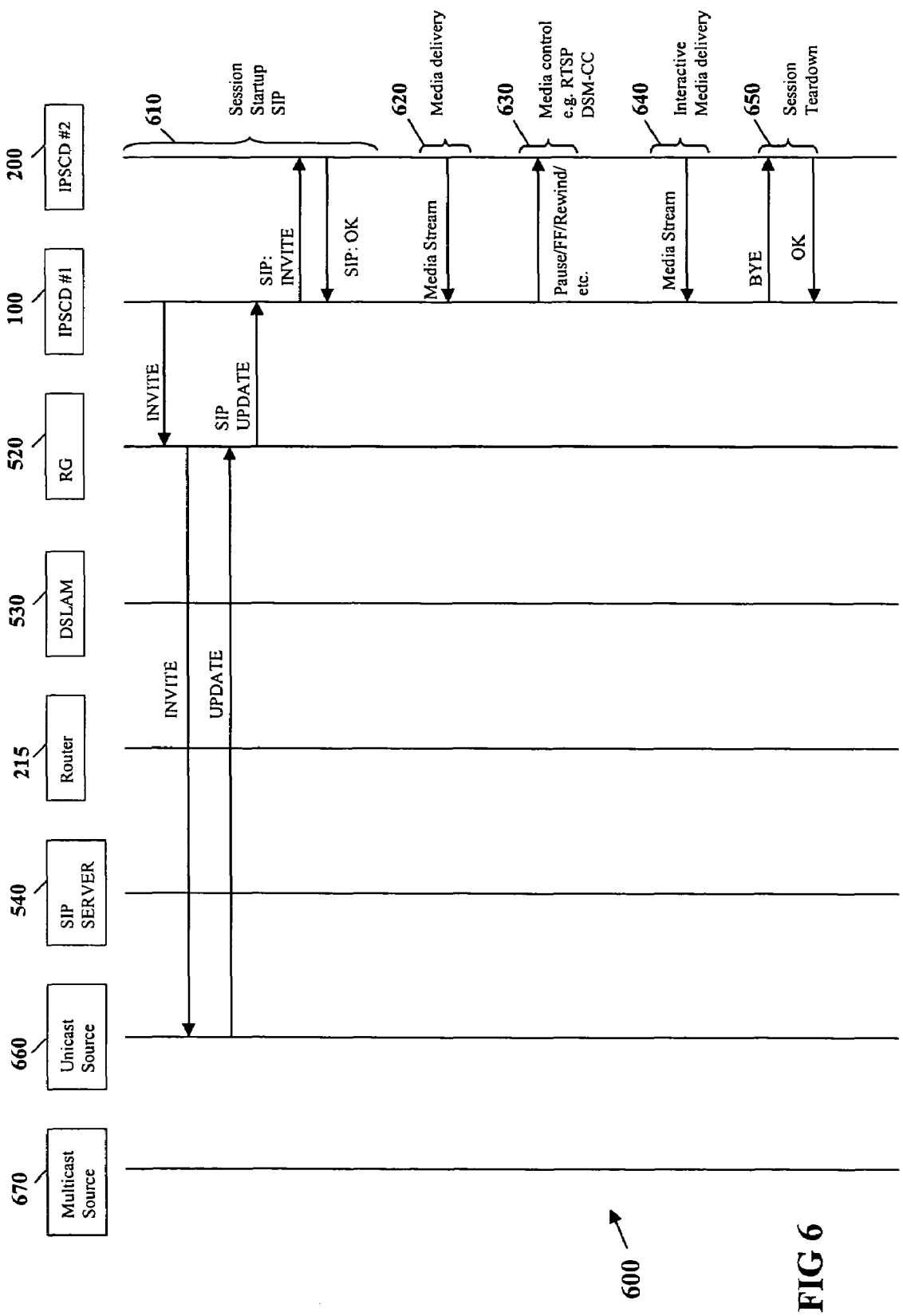
FIGS. 6-7 illustrate exemplary media sessions according to some of the embodiments of this invention.

FIG. 6 is a schematic illustrating an exemplary unicast media session 600. Here the residential gateway 520 knows the unicast source 660 for initiating the unicast media session, and the customer is authorized to access this media source. When the customer desires a session, the multimedia device 100 communicates an SIP invite. The residential gateway receives and inspects the SIP invite and communicates the SIP invite to the unicast source 660. The residential gateway, however, only observes and forwards the SIP invite—the residential gateway does not alter/change the SIP invite. The SIP invite communicates to the communications network via the DSLAM 530. Various routers 215 route the SIP invite to an appropriate unicast video source 660. A server of the unicast source 560 responds with an "UPDATE" or similar message indicating that the SIP invite looks like a reasonable request, that the content can be supplied by the second multimedia device 200, and that includes a second private communications address of the second multimedia device 200. The "UPDATE" response return communicates to the residential gateway and forwards to the multimedia device 100. The multimedia device 100 then initiates an updated SIP invite to a second private communications address of the second multimedia device 200. These steps are referred to as the session startup session shown with reference numeral 610. Then, the requested media stream then communicates from the second multimedia device 200 to the multimedia device 100. This is shown as media delivery reference numeral 620. From the SIP message exchange, the multimedia device 100 has sufficient information to identify the media stream and to present the media stream to the multimedia device. During communication of the media stream, the customer may activate media control of the media stream, shown as media control reference numeral 630. For example, the customer may actuate a push button of the remote 306 to activate a fast-forward function, a rewind function, a pause function, a stop function, a bookmark function, a scene jump function, a status function, and an alternate presentation function. When the media control is activated, the multimedia device 100 communicates the selected presentation command to the second multimedia device 200, and the selected presentation command is processed by the IPSCD Management Module 110 to alter delivery of the media stream to the multimedia device 100 in accordance with the selected presentation command. This is show as interactive media delivery reference numeral 640. Similarly, the customer may activate a communications preference of the media stream. For example, the customer may activate a push button of the remote 306 to terminate transmission of the media stream (shown as session teardown reference numeral 650), to re-direct communication of the media stream to yet another communications device (not shown), or to interrupt communication of the media stream.

Figure 7:
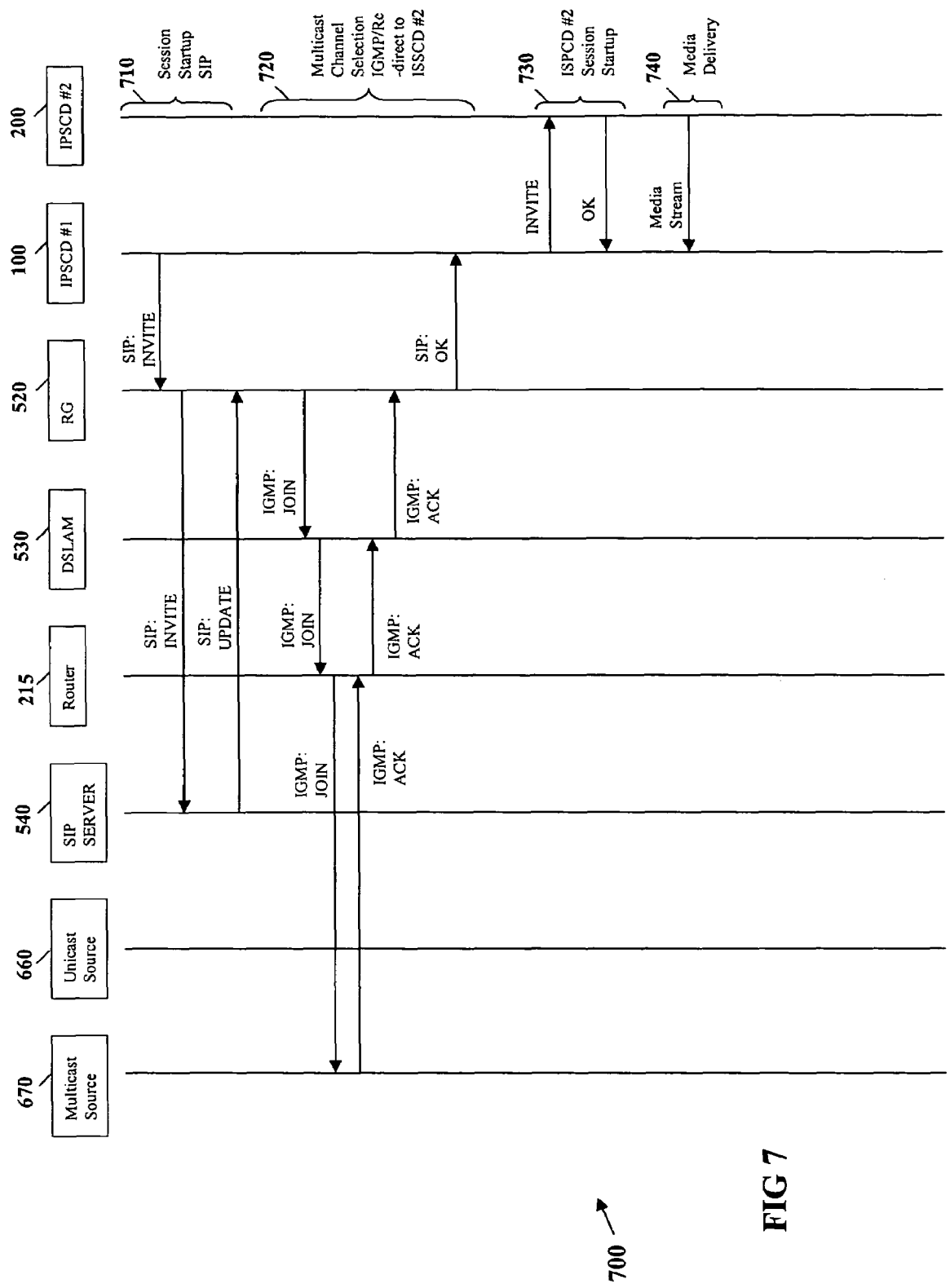

FIG. 7 is a schematic illustrating a multicast media session 700 according to some of the embodiments of this invention. Here the residential gateway 520 knows multicast source 670 for initiating the multicast media session, and the customer is authorized to access this media source. When the customer desires a session, the multimedia device 100 communicates the SIP invite. The residential gateway 520 receives and inspects the SIP invite and determines that the SIP invite is associated with an authorized multicast source 670. These steps are shown as session startup SIP in reference numeral 710. Thereafter, the residential gateway 520 generates an Internet Group Management Protocol (IGMP) join that is communicated to the DSLAM 530. The DSLAM 530 receives and forwards the IGMP join to one or more routers 215. Various routers 215 within the communications network route the IGMP join to the appropriate multicast video source 670. The IGMP may be used symmetrically or asymmetrically, such as asymmetric protocol used between multicast routers 215. Thereafter, a content server of the multicast source 670 responds with an IGMP UPDATE or similar message indicating the IGMP join looks like a reasonable request, that the content can be supplied by the second multimedia device 200, and that includes a second private communications address of the second multimedia device 200. The IGMP UPDATE is communicated to the routers 215, from the routers 215 to the DSLAM 530, then from the DSLAM 530 to the residential gateway 520. The residential gateway 520 converts the IGMP UPDATE to an SIP protocol "OK" and forwards the "OK" to the multimedia device 100. These steps are shown as multicast channel selection in reference numeral 720. Similar to above, the multimedia device 100 then initiates an updated SIP invite to a second private communications address of the second multimedia device 200 and the second multimedia device 200 responds with an "OK." This is shown as ISPCD #2 session startup shown as reference 730. The requested media stream then communicates from the second multimedia device 200 to the multimedia device 100 and this is shown as media delivery reference numeral 740. From the SIP message exchange, the multimedia device 100 has sufficient information to identify the media stream and to present the media stream to the multimedia device. Further, during communication of the media stream, the customer may activate media control of the media stream to control presentation and/or communication of the media stream.

The IPSCD Management Module (shown as reference numeral 110 in FIGS. 1 and 3-4) may be physically embodied on or in a computer-readable medium. This computer-readable medium may include CD-ROM, DVD, tape, cassette, floppy disk, memory card, and large-capacity disk (such as IOMEGA.®, ZIP.®, JAZZ®, and other large-capacity memory products (IOMEGA®, ZIP®, and JAZZ® are registered trademarks of Iomega Corporation, 1821 W. Iomega Way, Roy, Utah 84067, 801.332.1000). This computer-readable medium, or media, could be distributed to end-users, licensees, and assignees. These types of computer-readable media, and other types not mentioned here but considered within the scope of this invention, allow the IPSCD Management Module to be easily disseminated.

Still in further exemplary embodiments, the IPSCD Management Module may be physically embodied on or in any addressable (e.g., HTTP, I.E.E.E. 802.11, Wireless Application Protocol (WAP)) wireless device capable of engaging in a session initiation protocol communication or other similar communication. Examples could include a computer, a wireless personal digital assistant (PDA), an Internet Protocol phone, and/or a wireless pager (some of these exemplary embodiments are shown in the figures).

While several exemplary implementations of embodiments of this invention are described herein, various modifications and alternate embodiments will occur to those of ordinary skill in the art. For example, other protocol requests for a media stream, such as Hyper-Text Transfer Protocol (HTTP) and/or other protocols utilizing various formats, such as URL formats, Extensible Style Sheet (XSL) formats, Real Simple Syndication (RSS) that uses XML structures and others may be similarly used to communicate orders from the private address of the multimedia device to a content source. Accordingly, this invention is intended to include those other variations, modifications, and alternate embodiments that adhere to the spirit and scope of this invention.

| Abbreviations & Additional Descriptions | |
|---|---|
| ALG | Application Layer Gateway |
| AS | Autonomous System |
| BRAS | Broadband Remote Access Server |
| CoS | Class of Service |
| DHCP | Dynamic Host Configuration Protocol |
| DNS | Domain Name Server |
| DSLAM | Digital Subscriber Line Access Module |
| DSM-CC | Digital Storage Media Command and Control |
| IGMP | Internet Group Membership Protocol |
| IP | Internet Protocol |
| IPSCD | Internet Protocol Service Consumer Device (also referred to as ISCD) |
| TVoIP | IP TeleVision |
| MPEG | Motion Picture Experts Group |
| NAT | Network Address Translation |
| PAT | Port Address Translation |
| QoS | Quality of Service |
| RG | Residential Gateway |
| RSVP | Resource reSerVation Protocol |
| RTP | Real-time Transport Protocol |
| RTSP | Real Time Streaming Protocol |
| SIP | Session Initiation Protocol |
| STB | Set Top Box |
| TCP | Transmission Control Protocol |
| TVoIP | Television over Internet Protocol |
| UDP | User Datagram Protocol |
| URL | Uniform Resource Locator |
| VoD | Video on Demand |

What is claimed is:

1. A method for providing media delivery services comprising:

receiving a session initiation protocol invitation from a first multimedia device to request a media stream, the invitation further comprising a first private communications address for communicating with the first multimedia device;

communicating the session initiation protocol invitation to a multimedia content server via a communications network;

receiving a session initiation protocol update from the multimedia content server via the communications network to access the media stream from a second multimedia device having a second private communications address;

communicating the session initiation protocol invitation from the first multimedia device to the second multimedia device;

wherein communicating the session initiation protocol invitation is performed by a residential gateway, wherein the residential gateway forwards the session initiation protocol invitation to a source, the source responding with the second private communications address, the residential gateway forwarding the session initiation protocol invitation to the first multimedia device for transmission to the second private communications address of the second multimedia device;

receiving a session initiation protocol confirmation from the second multimedia device to communicate the media stream, the confirmation further comprising a communications identifier for identifying the media stream; and communicating the media stream from the second multimedia device to the private communications address of the first multimedia device;

wherein the multimedia content server is a multicast source;

wherein communicating the session initiation protocol invitation to the multicast source via the communications network comprises translating the session initiation protocol invitation to an internet group management protocol join and communicating the internet group management protocol join to the multicast source via the communications network and wherein receiving a session initiation protocol update from the multicast source via the communications network comprises receiving an internet group management protocol update via the communications network, the update further comprising the second private communications address of the second multimedia device.

2. A method for providing a media stream to a multimedia system comprising:

initiating an order for the media stream from a first multimedia device via a session initiation protocol invitation over a communications network, wherein at least one multicast multimedia content server identifies a second multimedia device as a media stream content source;

wherein a residential gateway forwards the session initiation protocol invitation to the multicast multimedia content server, the multicast multimedia content server responding with a second private communications address of the second multimedia device, the residential gateway forwarding the session initiation protocol invitation to the first multimedia device for transmission to the second private communications address of the second multimedia device;

communicating an internet group management protocol update, the update identifying the second private communications address of the second multimedia device for accessing, ordering and otherwise managing the media stream;

communicating the internet group management protocol update from the at least one multicast multimedia content server via the communications network to the first multimedia device;

using the update to communicate an updated session initiation protocol invitation from the first multimedia device to the second multimedia device;

communicating and identifying the media stream from the second multimedia device to the first multimedia device; and presenting the media stream to the first multimedia device.

3. The method of claim 2 wherein:

the first multimedia device and the second multimedia device are residential set top boxes.

* * * * *